United States Patent Office 3,725,211
Patented Apr. 3, 1973

3,725,211
CONTINUOUS DISTILLATION OF PHTHALIC ANHYDRIDE WITH VAPOR SIDE STREAM RECOVERY
Hubert Gehrken, Weiden, Gerd Helms, Junkersdorf, Gerhard Keunecke, Geyen, and Herbert Krimphove, Cologne-Muengersdorf, Germany, assignors to Chemiebau Dr. A. Zieren GmbH & Co. KG, Cologne-Muengersdorf, Germany
Continuation-in-part of application Ser. No. 843,871, Apr. 1, 1969. This application Mar. 1, 1972, Ser. No. 231,015
Int. Cl. B01d 3/14; C07c 63/18
U.S. Cl. 203—74                    12 Claims

ABSTRACT OF THE DISCLOSURE

A process for continuous distillation purification of phthalic anhydride wherein preheated phthalic anhydride is fed to the middle section of a distillation column operated under a sump pressure of about 550–800 mm. Hg; forerunnings containing more volatile components are continuously separated at the head of the column; a residue containing higher-boiling contaminates is withdrawn from the sump; and a sidestream of purified phthalic anhydride having a purity of 99.1 to 99.95% by weight is removed in the vapor phase from the lower part of the column stripping section. Further purification may be obtained by passing the purified sidestream product into a small vacuum distillation column.

CROSS REFERENCE TO RELATED APPLICATION

This application is a continuation-in-part of application Ser. No. 843,871, filed Apr. 1, 1969 and now abandoned.

BACKGROUND OF THE INVENTION

Field of the invention

This invention relates to a distillation process for the purification of phthalic anhydride.

Description of the prior art

Crude phthalic anhydride produced by the gas phase air oxidation of naphthalene or o-xylene contains various impurities which must be removed by suitable purification methods (mostly two step techniques) in order to produce a sufficiently pure, marketable product. For example, one purification technique is to thermally pretreat phthalic anhydride, with or without the addition of chemicals, and then subject the pretreated product to fractional distillation. The pretreatment is especially necessary for crude products prepared from naphthalene, since any naphthoquinones present must be converted, by resinification, into high boiling compounds which do not evaporate during subsequent distillation, thereby facilitating their separation in the form of a residue.

Crude product obtained from o-xylene is also generally subjected to a pretreatment step in order to separate the water present therein, as well as part of the maleic acid anhydride and other components more volatile than phthalic anhydride. The removal of these impurities is desirable; otherwise, under distillation conditions, high-melting dicarboxylic acids form, and foul the condensers in the distillation system.

Another known purification technique is a two-stage distillation process wherein forerunnings containing the more volatile components are separated at the head of a first distillation column operated under normal pressure, and the prepurified product withdrawn from this column in the liquid phase is distilled off, except for a residue, in a second distillation column operated under vacuum. This technique, however, is disadvantageous insofar as the higher-boiling components enriched in the sump of the first column and circulated in the reboiler cycle thereof thereafter pass into the sump of the vacuum column and circulate in the reboiler cycle of this latter column until they are withdrawn. Because of this load of high boiling components on the reboiler cycles of both columns, the reboilers of both cycles are clogged up in a relatively short time, resulting in frequent shutdown and/or clean-up schedules.

Another common method to obtain pure phthalic anhydride is to subject the crude product prepared by the oxidation of naphthalene or o-xylene to a first vacuum distillation step in order to remove the more volatile impurities, and then to distill off the pure product from the residue in a second vacuum distillation step. Also when employing this mode of operation, all the high boiling impurities enter the second vacuum column where they must then be separated from the phthalic anhydride. In practice, both of these vacuum distillation steps, especially the latter, require a substantial number of actual plates, e.g. about 20 to 30, resulting in large investment costs for the process.

SUMMARY OF THE INVENTION

A principal object of this invention is to provide an improved system for the purification of phthalic anhydride.

Another object of this invention is to provide a continuous single-stage distillation process for phthalic anhydride.

A further object is to provide an improved two-stage distillation process for phthalic anhydride wherein the costs of the columns is appreciably lower than the columns used for the prior art vacuum systems.

Upon further study of the specification and claims, these and other objects and advantages of the present invention will become apparent.

Briefly, these and other objects of the present invention are obtained in one aspect by a process for the continuous distillation purification of phthalic anhydride wherein preheated phthalic anhydride is fed to the middle section of a distillation column operated under a sump pressure of about 550–800 mm. Hg; forerunnings containing more volatile components are continuously separated at the head of the column; a residue containing higher-boiling contaminates is withdrawn from the sump; and a sidestream of purified phthalic anhydride having a purity of 99.1 to 99.95% by weight is removed in the vapor phase from the lower part of the column stripping section. Further purification may be obtained by passing the purified sidestream product into a second distillation column, such as a small vacuum distillation column. In this manner, a crude phthalic anhydride is continuously separated in the column into:

(1) a relatively pure first product;
(2) forerunnings containing the more volatile impurities; and
(3) a residue containing the higher-boiling components.

Consequently, for the further purification of the phthalic anhydride product withdrawn from the column, a comparatively small second column of 5 to 10 theoretical plates is sufficient.

DETAILED DISCUSSION OF THE INVENTION

The process of the present invention is particularly suitable for use in purifying crude phthalic anhydride having a purity from about 92 to 99.4% by weight, which has been prepared by the gas phase air oxidation of naphthalene or o-xylene. The purity of such a phthalic anhydride feed is increased by from 0.5 to 7.1% by weight, resulting in a purified sidestream product having a purity of 99.1 to 99.95% by weight.

Preferably, the sidestream product is separated from the crude phthalic anhydride feed in a fractionating column having approximately 10–30 theoretical plates, operating with a reflux ratio of about 20–100. Preferably, the fractionating distillation column will have a stripping section comprising 6–18 theoretical plates and an enriching section having 4–12 theoretical plates, the entire column having approximately 10–30 theoretical plates as aforesaid. In the stripping section of the column (below the feed point), water and components more volatile than phthalic anhydride are stripped from the phthalic anhydride. The resulting phthalic anhydride, higher-boiling impurities and residue which pass down to the sump of the column are partially revaporized in a forced circulation evaporator or the like. Accordingly, under steady state conditions, the residue containing the higher-boiling impurities collects in the sump of the column and also in the vaporization system. The residue can then be withdrawn by way of a valve in a continuous or discontinuous fashion.

The vapors rising in the column are gradually enriched in the more volatile components. At the head of the column, forerunnings are continuously withdrawn containing, for example, about 44% by weight of phthalic anhydride, 36% by weight of benzoic acid, and 20% by weight of maleic acid anhydride.

An important aspect of this invention is that appreciable purification of the phthalic anhydride is obtained in a single column. The thus-prepurified product comprises, for example, 99.1 to 99.95% by weight of phthalic anhydride, in addition to minor amounts of higher-boiling substances. In this connection, it is essential that the prepurified product is withdrawn from the stripping section in the vapor phase, since the concentration of the less volatile impurities is considerably lower in the vapor phase than in the liquid phase.

In accordance with a preferred embodiment of the invention, the prepurified product is withdrawn from one of the lower plates of the stripping section. It was unexpectedly discovered that the vapor phase above one of the lower plates, particularly the vapor in contact with the liquid on the first to fourth plates above the sump, contains the lowest total concentration of higher- and lower-boiling impurities. The precise point at which the vapor phase first product can be withdrawn from the stripping section with the lowest content of impurities depends on the amount and type of the impurities in the crude product and can readily be determined by routine chemical analysis once the concept is understood that a minimum concentration can be found. For example, from an unpretreated crude feed of about 94% by weight phthalic anhydride, a purified product of 99.8% phthalic anhydride can be withdrawn from the vapor chamber of the second actual plate. This purified first product containing minor amounts of higher-boiling substances can be further purified in a second distillation column having relatively low number of plates, for example 5–10, preferably 6 to 7 theoretical plates.

The purified product withdrawn from the stripping section of the first column is advantageously condensed before being fed to a second distillation column. The pipeline between the two columns preferably contains first a trap for separating any entrained droplets from the vapor phase, a regulating valve and a condenser wherein the vapor phase, prepurified first product is condensed. The thus-obtained liquid first product can be fed to the bottom of the second column which is operated under vacuum. By liquefying the prepurified product, it is possible to utilize a surge storage tank after the condenser, from which tank the prepurified product is pumped into the second vacuum column. In this manner, the operation of the system is more flexible and adaptable to column upset within certain limits.

In accordance with another embodiment of the invention, the prepurified product withdrawn from the stripping section of the first column is introduced in the vapor phase into the sump of a second distillation column. In this case, the condenser, the collecting vessel, and one pump in the product pipeline between the columns are omitted, but the trap and a regulating valve for reducing the pressure to the vacuum of the second column are required. This construction exhibits the further advantage that the reboiler (forced circulation evaporator) of the second column requires less heat exchange area.

In accordance with a preferred embodiment of the invention, the additional provision is made that the vapors at the head of the first distillation column are condensed on cooling surfaces, the temperature of which is maintained above 180° C., preferably at 230° C. By maintaining a head temperature of above 180° C., the deposition of dicarboxylic acids in the solid phase is avoided. In addition, it is important to maintain a temperature in all parts of the column which is above the temperature necessary to convert phthalic acid to phthalic anhydride and water. In this manner, the decomposition of the free acids into anhydride, which is customarily conducted in a very time-consuming pretreatment, is now effected within the column, and conversely, there is avoided any reverse reaction of acid formation from anhydrides and water contained in the crude product.

The maintenance of a minimum temperature of 180° C. in the condensation system also ensures that the formation and deposition of high-melting dicarboxylic acids is avoided, thereby extending the cleaning schedule for such equipment. In this manner, an important source of column disruptions is eliminated, which disruptions occur especially during the distillation under a high vacuum, since in that case the condenser temperature must be set to considerably below 180° C. in order to avoid losses of phthalic anhydride. In the predistillation step of this invention, operated under a pressure of between 550 and 800 mm. Hg, preferably 600 to 760 mm. Hg, the temperature of the cooling surfaces of the condensing system can be set to temperatures above 180° C. without the danger of excessive losses of phthalic anhydride. Although the higher temperature entails a reduction of the forerunnings to be withdrawn from the head, there is no increase in the loss of phthalic anhydride.

As another aspect of this invention, provision is made for the continuous withdrawal of a residue from the sump of the first distillation column or from the reboiler cycle thereof, constituting 0.3–1.0% by weight, preferably about 0.5% by weight, of the crude phthalic anhydride fed to said column. Because the predominant portion of the higher-boiling components is thus removed in the first distillation column, only 0.01–0.05% by weight of the crude phthalic anhydride fed to the first column is withdrawn as the residue from the sump of the second distillation column or from the reboiler cycle thereof. In contrast to the conventional processes, in the process of this invention, a very pure product is obtained in the first distillation column, so that the withdrawal of residue from the reboiler cycle of the second column is minor and is required only sporadically, if desired.

Suitably, 0.2–1.0% by weight of the crude phthalic anhydride is withdrawn at the head of the first column as the forerunnings. The amount of the forerunnings is naturally dependent on the impurities in the crude product and will be smaller in case of a pretreated product than in a product which is not pretreated. However, the essential factor is that the process of this invention is suitable in an equal manner to pretreated and unpretreated products, although a particular advantage of the invention is that a phthalic anhydride of high purity can be produced without any pretreatment and with a comparatively low expenditure in apparatus.

DESCRIPTION OF THE PREFERRED EMBODIMENTS

Figure 1:
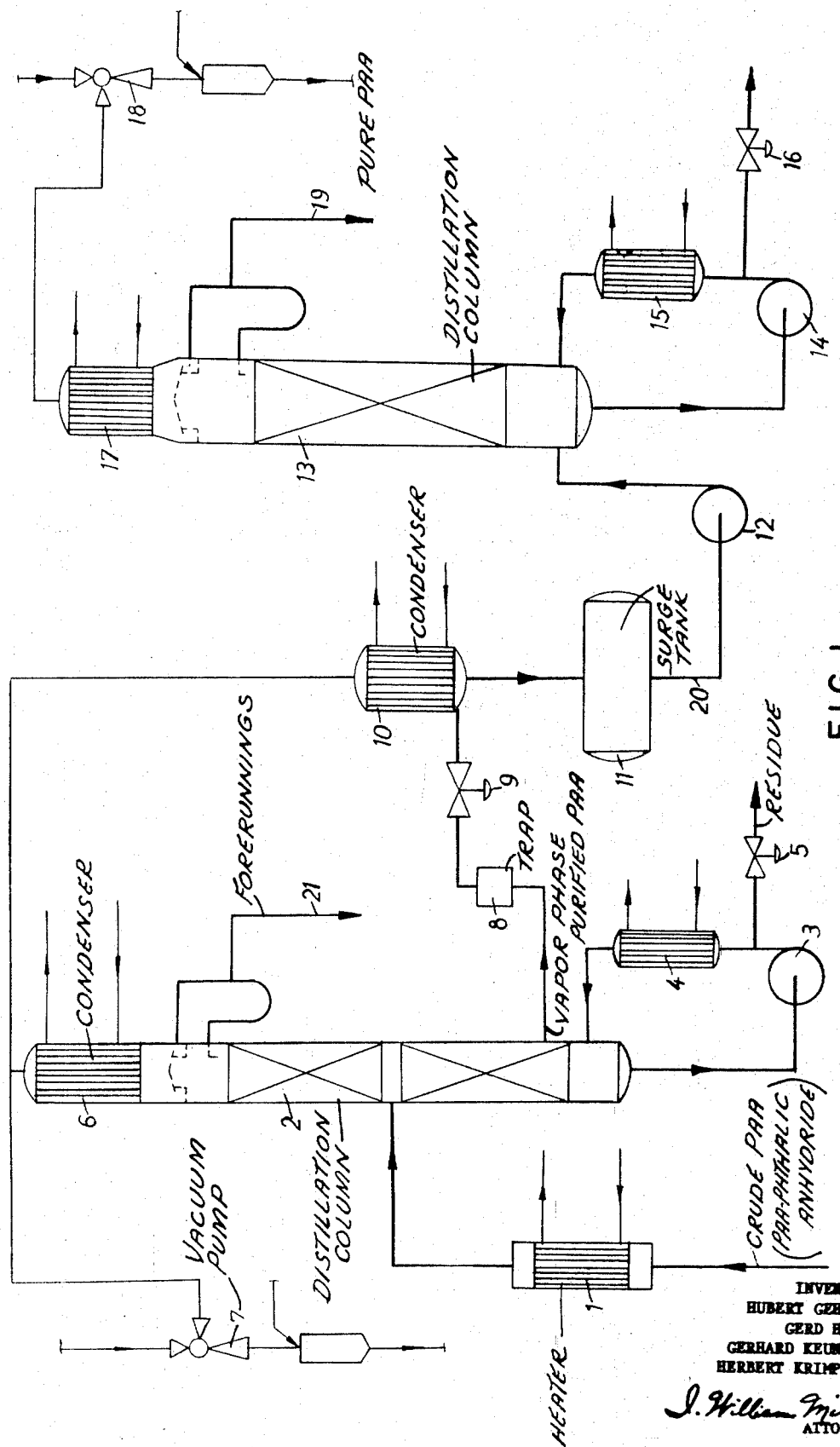
FIG. 1 is a schematic layout of apparatus suitable for conducting a first preferred embodiment of the invention wherein product is condensed before entering the second column.

The distillation plant of FIG. 1 comprises a first distillation column 2 having about 6 to 18 theoretical plates in the stripping section and about 4 to 12 theoretical plates in the enriching section. This column is operated with a reflux ratio of about 20 to 100 and under a vacuum of 550–800 mm. Hg. A second smaller distillation column 13 operated under a pressure of about 20–120 mm. Hg and a reflux ratio of about 1.5 to 5. Both columns are in communication by means of a product pipeline 20. The column 2 contains overall 10–30 theoretical plates and is provided, at the head thereof, with a condenser 6 maintained at about a temperature of 230° C. The condenser 6 is also in communication with a vacuum pump 7 and by means of this pump, the pressure at the head of column 2, can be set, as desired, in the range of 500–760 mm. Hg.

A reboiler cycle with a pump 3 and reboiler 4 is connected to the sump of the column 2, thereby permitting the sump product to be circulated and heated. The residue can be withdrawn from the vaporizer cycle by way of a valve 5.

In order to heat the crude phthalic anhydride to a feed temperature of, for example, 270° C., a heat exchanger 1 is provided, the outlet of which is in communication with the feed point of the column 2. While the forerunnings are withdrawn at the head of the column at 21, and the residue is removed via valve 5 of the reboiler cycle, the point of connection of the connecting conduit 20 to the column 2 is disposed in the vapor space above the second plate. In line 20, in proximity to the column 2, trap 8 is provided, serving for separating the entrained liquid droplets from the vapor stream. Furthermore, a condenser 10 is provided in line 20, functioning to condense the first product vapors withdrawn from column 2. A valve 9 between the trap 6 and the condenser 10 serves to control the withdrawal of vapor from column 2. The condenser 10, in the same manner as the condenser 6, is connected to the vacuum pump 7, in order to remove, by suction, any readily volatile components remaining in the gaseous phase during the condensation. Additionally, between the condenser 10 and the vacuum column 13, a surge tank 11 for the condensed first product and a pump 12 are provided in line 20. The surge tank 11 makes it possible to charge column 13 in a manner somewhat independent of the withdrawal of vapor from column 2.

The vacuum column 13 is operated under a pressure of 60 mm. Hg and contains 6 to 7, preferably 6 theoretical plates. To the sump of column 13, there is likewise connected a reboiler cycle comprising the reboiler 15, a pump 14 and a valve 16 for blowoff purposes. The column 13 carries a condenser 17, the cooling surfaces of which are maintained above the melting point of phthalic anhydride by means of heat transfer fluid. The pure phthalic anhydride is withdrawn at 19 from the head of the column. The vacuum pump means for maintaining the vacuum in the column bears reference numeral 18.

Figure 2:
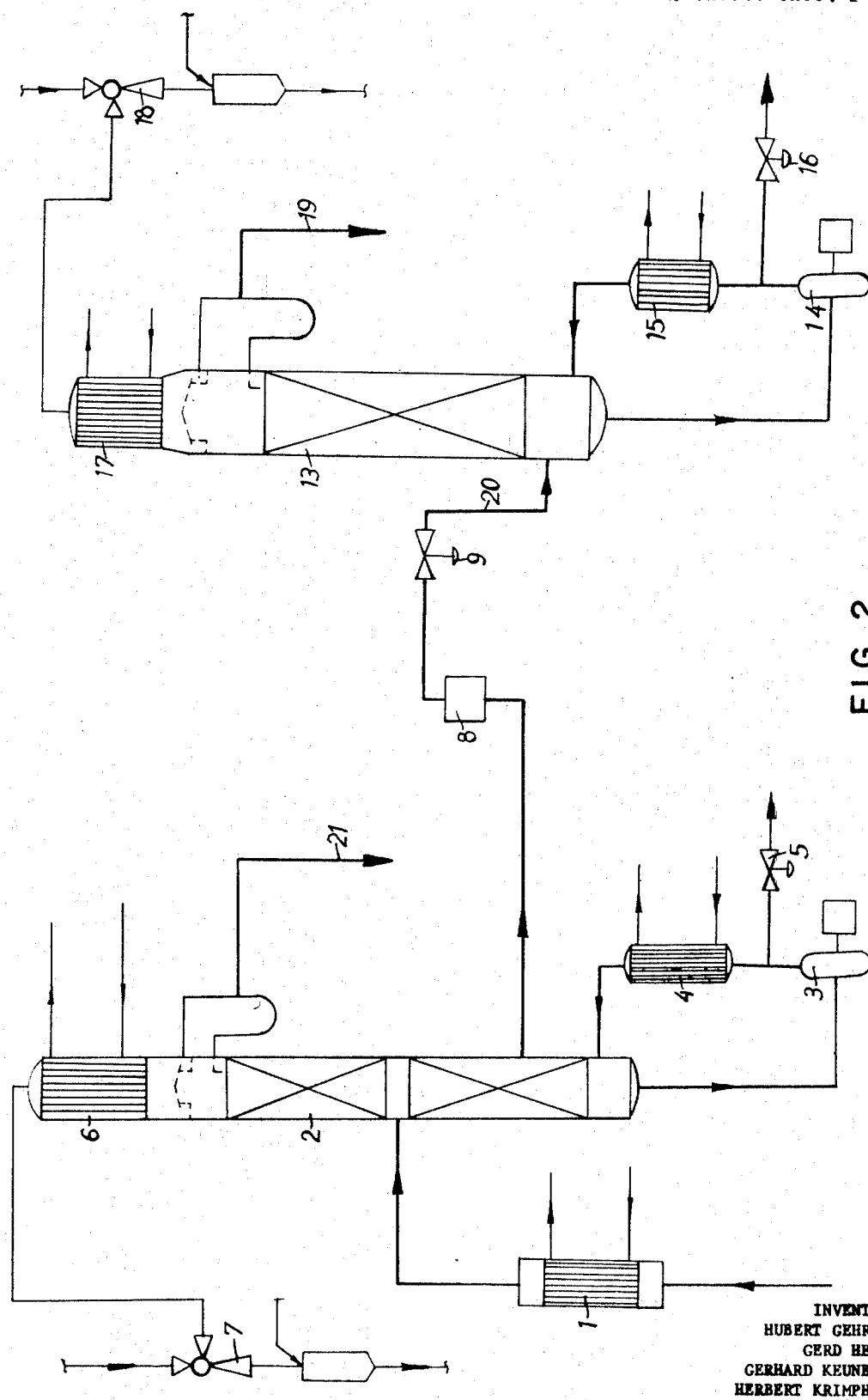
FIG. 2 is a schematic layout of apparatus suitable for conducting a second preferred embodiment of the invention wherein product in the vapor phase is fed directly into the second column.

The layout of FIG. 2 is used to conduct a second preferred embodiment of this invention. In FIG. 2, the vapor of the prepurified product withdrawn from column 2, is introduced, after passing through the trap 8, directly into the sump of the vacuum column 13. When proceeding in this manner, components 10 to 12 of FIG. 1 are eliminated, and a heat exchanger 15 with a smaller heat exchange surface can be utilized. Opposed to this is the fact that the load on column 13 is directly dependent on the product withdrawn from column 2.

Aside from the illustrated embodiments, it is also possible, in case of a crude product obtained at a constant composition and/or optionally pretreated, to obtain a product directly from the first column which satisfies industrial purity requirements. In this case, the small vacuum column connected after the first column is eliminated. Accordingly, the operation of each column in itself serves to represent a step which accomplishes a result useful in itself.

Having now generally described the invention, the following examples are provided by way of illustration so that those skilled in the art may obtain an even fuller understanding thereof. Unless otherwise indicated, all percentages are parts by weight.

Example 1

Crude, unpretreated phthalic anhydride obtained by oxidation of o-xylene is continuously introduced on the 8th plate of a pilot bubble cap plate column with 20 theoretical plates. The crude feed has the following composition:

|   | Percent |
|---|---|
| Phthalic anhydride | 93.8 |
| Phthalic acid | 4.7 |
| Maleic anhydride | 0.5 |
| Benzoic acid | 0.3 |
| Phthalide | 0.1 |
| o-Toluic acid | 0.1 |
| Unknown components boiling higher than PA and residue | 0.3 |
| Lower boiling unknown components | 0.2 |

The column was operated under a vacuum of 560 mm. Hg in the sump and at a sump temperature of 260–265° C. The product stream was taken off from the vapor space of the 3rd practical plate and condensed. The condensate had the following composition:

|   | Percent |
|---|---|
| Phthalic anhydride | 99.2 |
| Maleic anhydride | 0.2 |
| Benzoic acid | 0.2 |
| Phthalide | 0.08 |
| o-Toluic acid | 0.10 |
| Unknown components boiling lower than PA | 0.10 |
| Unknown components boiling higher than PA and residue | 0.10 |

The phthalic anhydride content is increased by 5.4%.

Example 2

A crude, thermally pretreated phthalic anhydride obtained by oxidation of o-xylene is continuously introduced into a pilot bubble cap plate column having 24 theoretical plates on the 12th practical plate. The crude has the following composition:

|   | Percent |
|---|---|
| Phthalic anhydride | 99.1 |
| Maleic anhydride | 0.25 |
| Benzoic anhydride | 0.2 |
| o-Toluic acid | 0.1 |
| Phthalide | 0.1 |
| Residue and higher boiling unknown components | 0.2 |
| Unknown components boiling lower than PA | 0.05 |

The column was operated under a vacuum of 700 mm. Hg and a temperature of 280° C. at the bottom. The product stream was withdrawn from the vapor phase of the 4th practical plate and condensed. Low and high boiling components were taken off from the top and the bottom of the column, respectively. The product stream had the following composition:

| | Percent |
|---|---|
| Phthalic anhydride | 99.7 |
| Maleic anhydride | 0.08 |
| Benzoic anhydride | 0.07 |
| o-Toluic acid | 0.02 |
| Phthalide | 0.03 |
| Higher boiling unknown components | 0.08 |
| Lower boiling components | 0.02 |

The phthalic anhydride content of the relatively pure feed is increased by 0.6%.

Example 3

Crude, unpretreated phthalic anhydride obtained by oxidation of pressed naphthalene is introduced into the column described in Example 1. The crude has the following composition:

| | Percent |
|---|---|
| Phthalic anhydride | 97.8 |
| Naphthochinone | 0.25 |
| Maleic anhydride | 0.76 |
| Unknown components boiling lower than PA | 0.6 |
| Unknown components boiling higher than PA | 0.5 |

The column was operated under a vacuum of 560 mm. Hg in the sump and at a sump temperature of 260–265° C. The product stream was taken off from the vapor phase of the 3rd practical plate and condensed. The condensate has the following composition:

| | Percent |
|---|---|
| Phthalic anhydride | 99.8 |
| Maleic anhydride | 0.1 |
| Unknown lower boilings | 0.05 |
| Unknown higher boilings | 0.05 |

The phthalic anhydride content is increased by 2.0%.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the distillation of crude phthalic anhydride having a purity of 92–99.4% by weight and produced by the gas phase air oxidation of naphthalene or o-xylene, the improvement comprising continuously feeding said crude phthalic anhydride to a distillation column between the stripping section and enriching section thereof, said stripping section having 6 to 18 theoretical plates, and said enriching section having 4 to 12 theoretical plates; operating said column under a sump pressure of about 550–800 mm. Hg, continuously withdrawing high boiling impurities from the sump of said column; continuously withdrawing volatile forerunnings from the top of said column and continuously withdrawing resultant phthalic anhydride having a purity of 99.1–99.95% by weight in the vapor phase above a plate in the stripping section of said column, said plate being any of the first to fourth plates above the sump, the purity of the crude phthalic anhydride being increased 0.5–7.1% by weight of phthalic anhydride by said distillation step.

2. The process of claim 1, wherein said crude phthalic anhydride is produced by the gas phase air oxidation of xylene.

3. A process as defined by claim 1, wherein said crude phthalic anhydride is produced by the gas phase air oxidation of naphthalene.

4. A process as defined by claim 1, comprising the further step of passing said resultant pre-purified phthalic anhydride in the vapor phase directly into the sump of a second distillation column and conducting a second distillation.

5. A process as defined by claim 1, wherein overhead vapors from said column are condensed on cooling surfaces maintained at above 180° C.

6. A process as defined by claim 1, wherein overhead vapors from said column are condensed on cooling surfaces maintained at about 230° C.

7. A process as defined by claim 1, wherein said residue is continuously withdrawn from said sump and comprises 0.3–1.0% by weight of said crude phthalic anhydride fed into said column.

8. A process as defined by claim 1, wherein said forerunnings comprise 0.2–1% by weight of said crude phthalic anhydride fed to the column.

9. A process as defined by claim 3, wherein said second distillation column is operated under vacuum, and additional residue is withdrawn from the sump of said second distillation column, said residue comprising 0.01–0.05% by weight of said crude phthalic anhydride fed to the first column.

10. A process as defined by claim 4, wherein said second distillation column is operated under vacuum and additional residue is withdrawn from the sump of said second distillation column, said residue comprising 0.01–0.05% by weight of said crude phthalic anhydride fed to the first column.

11. A process as defined by claim 4, said second distillation column having 5–10 theoretical plates.

12. A process as defined by claim 4, said second distillation column having 6–7 theoretical plates.

References Cited

UNITED STATES PATENTS

| | | | |
|---|---|---|---|
| 2,574,644 | 11/1951 | Landau | 260—346.7 |
| 2,640,017 | 5/1953 | Graff | 203—99 |
| 2,670,325 | 2/1954 | West et al. | 260—346.7 |
| 2,672,434 | 3/1954 | MacFarlane | 203—74 |
| 2,672,435 | 3/1954 | Shoptaw | 203—82 |
| 2,786,805 | 3/1957 | Sullivan et al. | 260—346.7 |
| 3,380,896 | 4/1968 | Scheiber et al. | 203—77 |
| 3,518,165 | 6/1970 | Ward | 203—99 |
| 3,530,044 | 9/1970 | Horn | 203—99 |

WILBUR L. BASCOMB, JR., Primary Examiner

U.S. Cl. X.R.

203—DIG 19, 91, 99; 260—346.7

UNITED STATES PATENT OFFICE
CERTIFICATE OF CORRECTION

Patent No. 3,725,211           Dated April 3, 1973

Inventor(s)   HUBERT GEHRKEN

It is certified that error appears in the above-identified patent and that said Letters Patent are hereby corrected as shown below:

<u>Column 1, in the Heading:</u>  Please add -- Claims priority,

Germany           P 17 68 094.3 of March 30, 1968--.

Signed and sealed this 14th day of May 1974.

(SEAL)
Attest:

EDWARD M. FLETCHER, JR.            C. MARSHALL DANN
Attesting Officer                  Commissioner of Patents